E. DAYTON.
Hose-Joint.

No. 161,492.

Patented March 30, 1875.

UNITED STATES PATENT OFFICE.

EDWIN DAYTON, OF MERIDEN, CONNECTICUT.

IMPROVEMENT IN HOSE-JOINTS.

Specification forming part of Letters Patent No. 161,492, dated March 30, 1875; application filed December 26, 1874.

*To all whom it may concern:*

Be it known that I, EDWIN DAYTON, of Meriden, in the county of New Haven and State of Connecticut, have invented a new Union Hose-Joint; and I do hereby declare the following, when taken in connection with the accompanying drawings and the letters of reference marked thereon, to be a full, clear, and exact description of the same, and which said drawings constitute part of this specification, and represent in—

Figure 1:
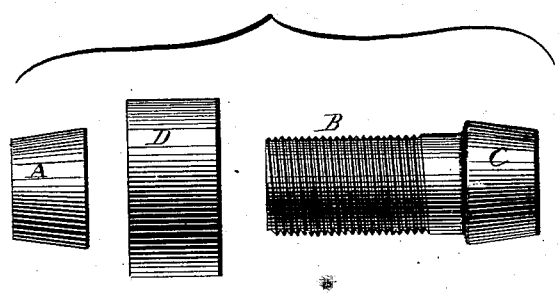
Figure 2:
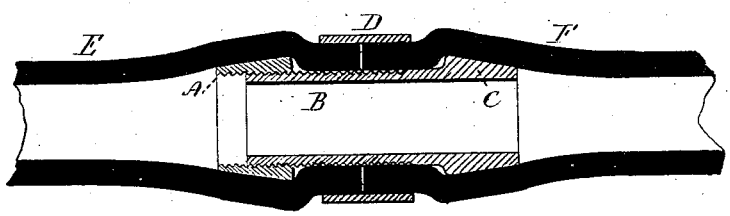

Figure 1 a side view of the three parts composing the joint; and in Fig. 2, a longitudinal section as applied to the joining of two pieces of hose.

This invention relates to a device for uniting two pieces of hose, the object being to afford a simple and secure means for splicing hose, repairing breaks, and like purposes; and it consists in an internally-threaded socket of larger external diameter than the internal diameter of the hose to be joined, inserted into the end of one section of the hose, combined with a correspondingly-threaded hollow plug provided at one end with an enlargement substantially like the said socket inserted into the end of the other section, and an intermediate external sleeve of about the external diameter of the hose, so that the socket and plug inserted into their respective ends of the hose so as to leave a portion of the hose projecting and the sleeve surrounding both projecting ends, and the two internal parts screwed together, the socket and the enlargement on the plug will clamp the sections of hose against the respective edges of the surrounding sleeve, as more fully hereinafter described.

A is the socket, its external diameter greater than the internal diameter of the hose to be joined, and, preferably, of less diameter at one end than at the other. This socket is screw-threaded upon its inside to receive the plug B, which is correspondingly threaded upon its exterior. The internal diameter of this plug should be about the same as the internal diameter of the hose, in order not to interrupt the flow through the hose. One end of the plug B is provided with an enlargement, C, corresponding substantially in external form to the socket A. D is the sleeve, the internal diameter of which is about the same as the external diameter of the hose to be joined. This completes the construction of the parts.

Its application to the union of two sections or pieces of hose, as shown in Fig. 2, is as follows: Insert the socket A into the end of one part E, distant from the end a little more than half the length of the sleeve D. Insert the enlarged end C of the plug, in similar manner, into the end of the other part F, then place the sleeve D over the end of one part; then screw the plug B into the socket until the pieces of hose are griped against their respective ends of the sleeve, as clearly seen in Fig. 2.

The friction between the hose and the socket and upon the enlargement C is sufficient to hold these parts so that by turning the hose the proper drawing together is accomplished without other connection with or appliance to the socket or plug.

While it is preferable to make the enlargement C a part of the plug B, that enlargement may be made a socket like A, and the plug be threaded to enter the same as to the socket A.

I, therefore, do not confine myself to the construction of the enlargement C, as a part of the plug; but I do claim as my invention—

The herein-described union joint, consisting of the internal socket A and plug B, provided with an enlargement, C, at one end, and the external sleeve D, substantially as set forth.

EDWIN DAYTON.

Witnesses:
 JOHN E. EARLE,
 J. H. SHUMWAY.